Nov. 6, 1962    E. R. SUMMERS    3,062,598
THRUST BEARING
Filed April 23, 1959    3 Sheets-Sheet 1
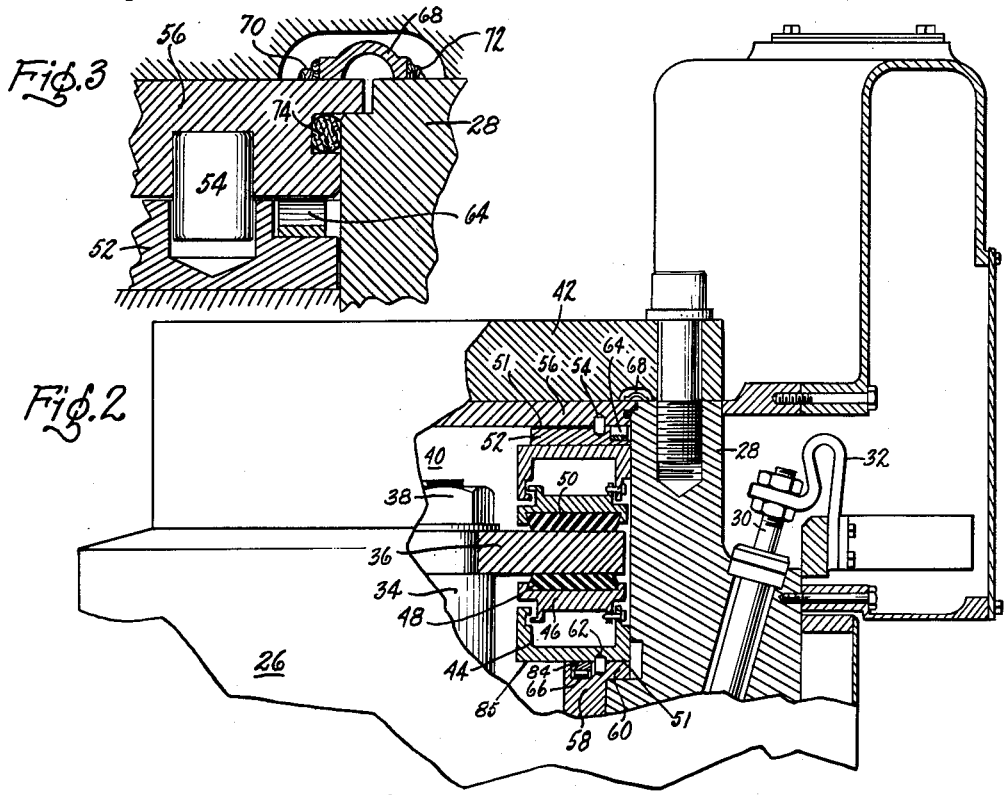
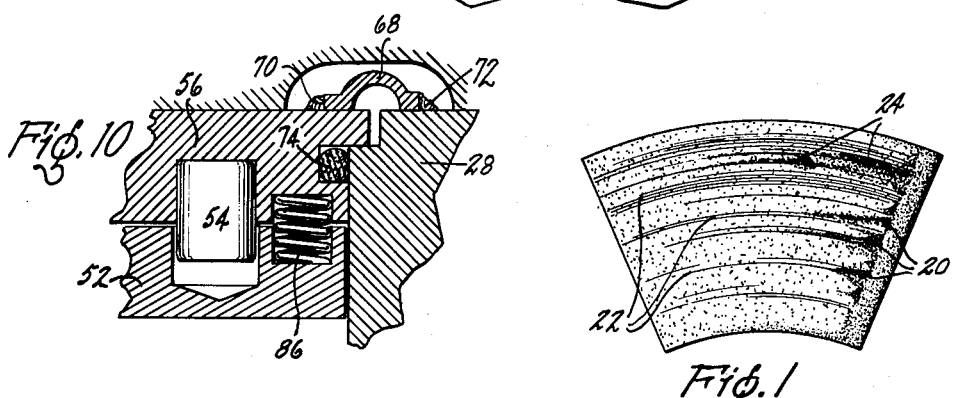
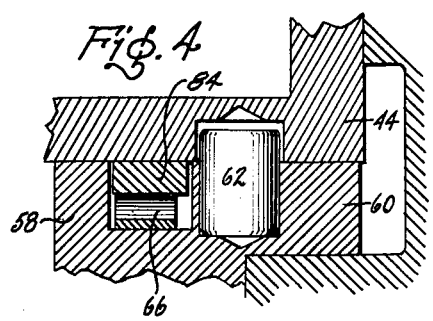
Inventor
Erwin R. Summers
by James R. Campbell
His Attorney

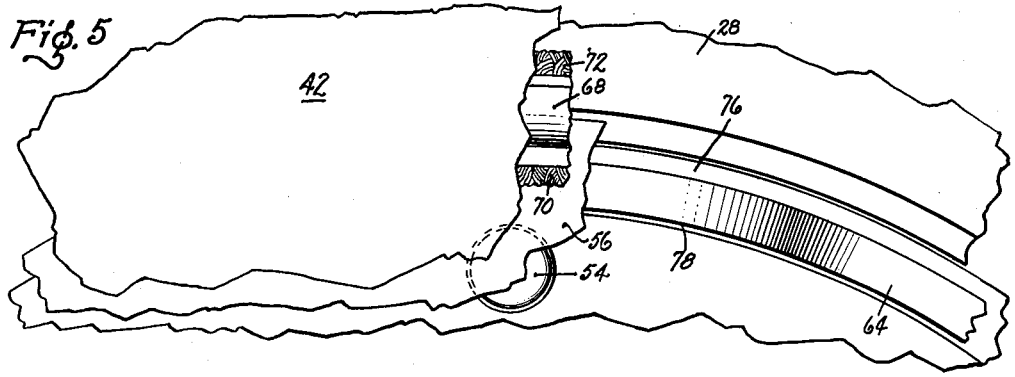
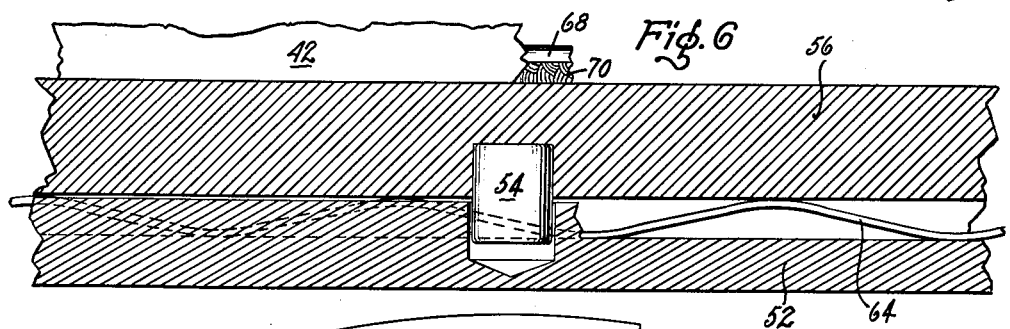
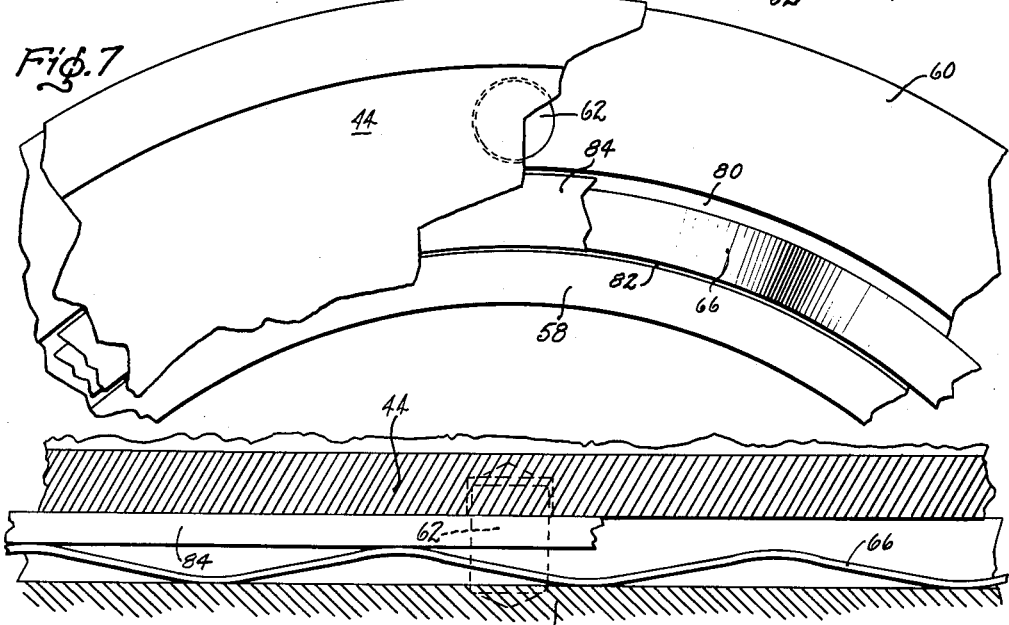
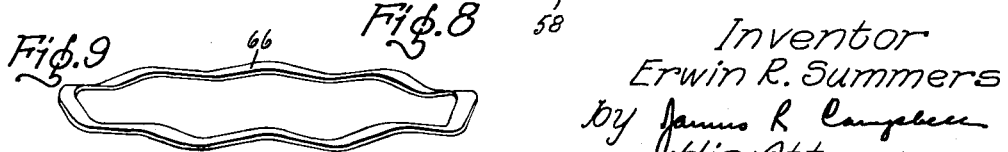

Nov. 6, 1962   E. R. SUMMERS   3,062,598
THRUST BEARING

Filed April 23, 1959   3 Sheets-Sheet 3

*INVENTOR.*
ERWIN R. SUMMERS
BY James R Campbell
*ATTORNEY*

United States Patent Office 3,062,598
Patented Nov. 6, 1962

3,062,598
THRUST BEARING
Erwin R. Summers, Scotia, N.Y., assignor to General Electric Company, a corporation of New York
Filed Apr. 23, 1959, Ser. No. 808,462
4 Claims. (Cl. 308—160)

The invention described herein relates to bearings and more particularly to water lubricated thrust bearings designed to maintain a predetermined clearance between carbon bearing pads and a thrust runner associated therewith when the bearing is placed in operation.

A conventional water lubricated thrust bearing consists of a circular runner mounted transversely on a rotatable shaft with carbon bearing pads disposed on opposite sides thereof for transmitting thrust forces to a machine base. A plurality of pads, such as six, equally spaced circumferentially on opposite sides of the runner, are supported by shoes and an equalizer mechanism designed to permit water lubricant to flow between the pads and runner surfaces for providing a fluid film necessary for intermittent and continuous operation. Since variations in manufacturing tolerances and expansion of parts resulting from heat preclude determining with exactness the amount of space required for a thrust bearing and runner, it has been customary to furnish a clearance between the parts to assure that some endplay exists. However, when the endplay is either too great or too small, a combination of many factors act to cause premature failure of the thrust bearing. For example, in a 900 h.p. motor, destruction of the bearing pads and runner has been observed after approximately two days of operation because of improper clearance. When the clearance is too small, the parts expand from the effects of heat to such an extent that binding between the rotating runner and other bearing parts occurs with bearing failure ultimately taking place.

When the clearance is too large, accelerated wear, grooving and erosion of the pads and runner may occur during operation. Considering a vertically disposed double thrust bearing with pads on both sides of the runner, when the thrust is downward, the angle of convergence between the runner and lower thrust bearing pads is sufficiently small so that as the water lubricant flows between the pads and runner, a gradual build up of fluid pressure occurs which results in a smooth flow through the small clearance between the runner and pad surfaces and no erosion of the carbon surfaces occurs.

However, because of excessive endplay, when the load is still downward, the angle of convergence between the runner and pad surfaces of the upper bearing assembly becomes very great, such that the leading edge of the pad is lifted a distance twice the rotor endplay and the pivot point by an amount equal to the endplay. The water-lift effect is caused by water being drawn under the leading edge by viscous drag when the runner is in motion. The trailing edge of the pad therefore is sometimes forced into contact with the runner surface by the water lubricant which now becomes extremely turbulent and is pressurized to such an extent that measured upward forces of more than 250 pounds per bearing have been found to exist. The net result of this action is that the pad surface is eroded by the turbulent water since its normal exit is blocked and turbulence also causes the pad to chatter on the runner surface. The particles of carbon thus removed by erosion adjacent the pad edge, and chipping of particles by chattering on the trailing edge, are introduced into the lubricating system. As the lubricant is circulated, the particles either pass between or become lodged in the pad and runner surfaces and ultimately cause grooving in the manner explained in applicant's copending application entitled Thrust Bearing, Serial No. 808,419, filed April 23, 1959.

An indication of the type of damage encountered by a thrust bearing pad is shown in FIGURE 1 wherein a trailing edge is illustrated as having particles of carbon chipped therefrom, as indicated at 20. The pad surface also is grooved, as at 22, because the circulated carbon particles are drawn under the pad by the motion of the runner surface. Also, erosion caused by turbulent flow of water beneath the pad wears depressions 24 in the pad surface.

The primary object of my invention therefore is to eliminate the deficiencies in prior art bearings by providing a bearing construction wherein a small clearance is maintained at all times between the pad crown and runner surface of an unloaded thrust bearnig when the shaft is rotated.

While the specification concludes with claims particularly pointing out and distinctly claiming the subject matter which I regard as my invention, it is believed the invention will be better understood from the following description taken in connection with the accompanying drawings in which:

FIGURE 1 is a plan view of a carbon bearing pad illustrating the damage occuring therein when placed and operated in a machine having excessive clearance between the pads and runner;

FIGURE 2 is a view in elevation, partly in section, illustrating the disposition of a thrust bearing assembly including springs used for maintaining the carbon pads within a predetermined distance of the runner surface when in operation;

FIGURE 3 is an enlarged sectional view in elevation illustrating the disposition of a spring in the upper part of a thrust bearing;

FIGURE 4 is an enlarged sectional view in elevation showing the location of a spring in the lower part of a thrust bearing;

FIGURE 5 is a plan view taken through a portion of the thrust bearing showing the location of the parts including a spring in the assembly;

FIGURE 6 is a view in elevation of the apparatus shown in FIGURE 5;

FIGURE 7 is a view similar to FIGURE 5 except that it illustrates the disposition of a spring in a lower part of the thrust bearing;

FIGURE 8 is a sectional view in elevation of the apparatus shown in FIGURE 7;

FIGURE 9 is a perspective view of a compression spring used in the thrust bearing assembly of FIGURE 2;

FIGURE 10 is a modification showing the use of coil springs as distinguished from the wave spring illustrated in the previous figures.

Figure 11:
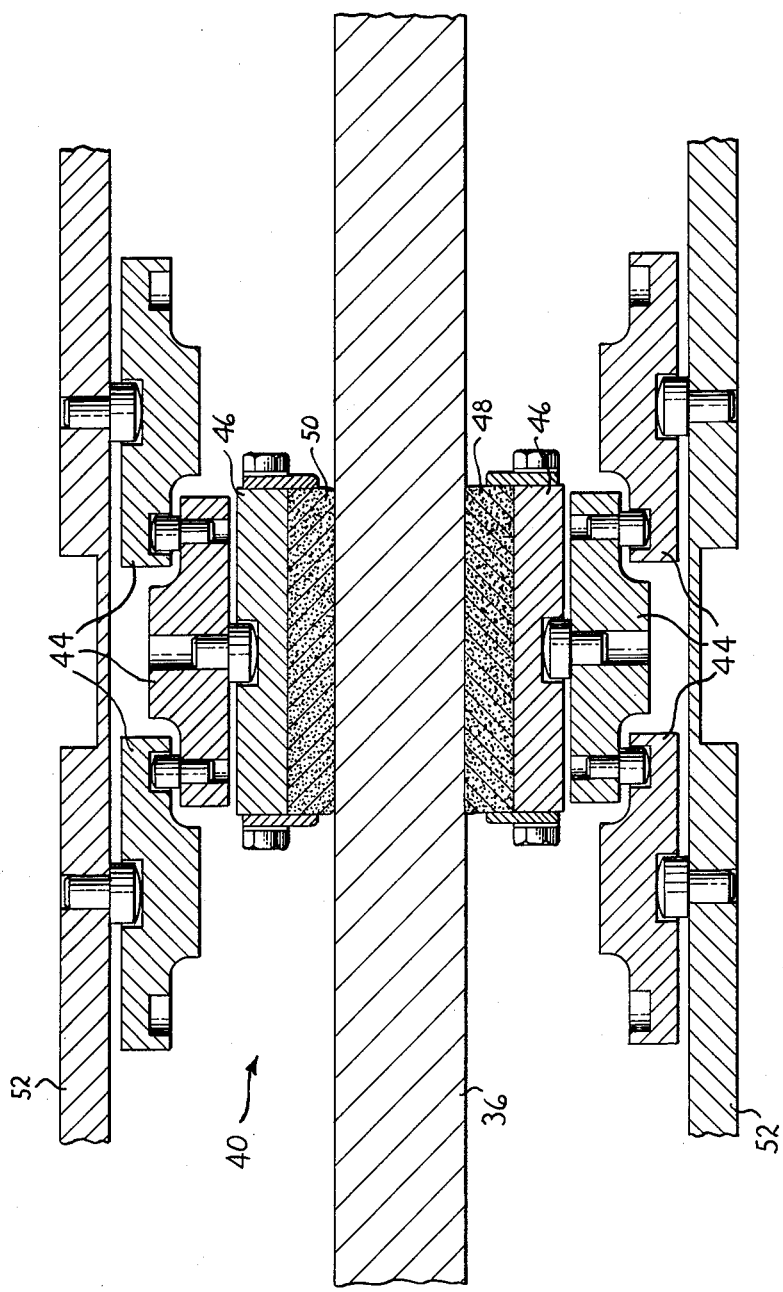
FIGURE 11 is a sectional view illustrating an equalizer mechanism of a conventional type.

Referring now to the drawings wherein like reference characters designate like or corresponding parts throughout the several views, a motor 26 is shown for illustrating the invention and consists of a stator frame 28 designed to contain a stator core having coil conductors therein (not shown). A device 30 is positioned within the frame 28 for carrying conductor leads 32 to the stator coils in the machine. A rotor 34 is located centrally within the stator core for electrodynamic cooperation therewith and includes a shaft having a circular runner 36 mounted on an end thereof and held in position by means of a nut 38 or similar securing means. A thrust bearing assembly 40, including thrust bearings disposed on opposite sides of the runner, are employed for transmitting thrust to the stator frame 28 and a stator cap 42 depending on the direction in which the thrust forces are transmitted. The thrust bearing on each side of the runner includes an equalizer mechanism of a conventional type consisting of a plurality of pivoted rockers and linkages 44 arranged for holding a series of shoes 46 having carbon pads 48 anchored therein. Both the lower thrust bearing carbon pads 48 and the upper pads 50 are generally, but not necessarily, of the same size and configuration, and as in a common construction, six of such pads are equally spaced circumferentially around the runner and are in contact therewith when the runner is at rest. A clearance 51 is provided and may occur at the upper or lower bearing structures, depending on the direction of thrust, for accommodating displacement in a vertical direction when the runner is placed in operation. The invention is described in relation to a vertical dynamoelectric machine but it will be evident that the improved thrust bearing has application to horizontal machines or any other kind of apparatus requiring thrust transmitting parts for successful operation, and particularly when using lubricants of low viscosity. In order to transmit thrust forces through the runner, pads and equalizer mechanism to a stator frame, the upper thrust bearing includes a circular ring 52 having a dowel pin 54 used for preventing relative movement between the ring 52 and a plate 56. The forces are transmitted through the lower thrust bearing to a structural member 58 which has a shoulder 60 bearing on a portion of the stator frame 28. Interconnection between the parts is facilitated by a dowel pin 62.

As indicated in the introductory portions of the specification, my objective of maintaining a satisfactorily small clearance between the upper and lower carbon bearing pads and their respective runner surfaces during operation, is accomplished by utilizing a spring associated with both the upper and lower thrust bearing elements. Both the upper and lower springs 64 and 66 are similar and of the type illustrated in FIGURE 9. They are commonly referred to as wave springs and made of a metal compatible with the lubricating medium used in providing a fluid film in the thrust bearing assembly. Water, oil or other medium may of course be used, depending on the material selected for use in the bearing pads and other machine components.

Since the lubricating medium must be confined, the plate 56 is positioned within a circular opening in the stator frame 28 and water lubricant is prevented from flowing outwardly between these two plate elements by a U-shaped metallic seal 68 having each leg welded to its respective plate as indicated at 70 and 72.

FIGURES 5 and 6 illustrate more clearly the disposition of the upper spring 64 in the bearing structure. The spring is of lesser width than the channel in plate 52 in which it is positioned and preferably with a clearance 76 on the outer diameter being greater than space 78 on the inner side thereof. This construction allows spring expansion and contraction in a radial direction when the load on the spring changes. The vertical size changes as the upward thrust varies but the spring cannot be additionally compressed by an amount greater than the clearance 51 between ring 52 and plate 56. As shown in FIGURE 6, the upper and lower surfaces of spring 64 are in constant contact with ring 52 and plate 56.

The spring 66 in the lower thrust bearing is similar to spring 64 and it likewise is located in a channel of sufficient width to accommodate expansion and contraction into the areas 80 and 82 thereof. The one difference in the construction however is that a washer 84 is placed above and in contact with the spring and in the same channel in order to bridge the water passages in the lower portion of the ring base 85 of the lower thrust bearing.

Typical spring forces of 150–450 pounds have been used on various systems and locations of bearings for obtaining approximately .010 inch clearance between the pads of the unloaded half of the thrust bearing and runner surface. The clearance 51 in the lower bearing of FIGURE 2 is shown only as a line because the thrust is downward, thus causing contact between the parts. The spring forces on the lower bearing however exceeds that on the top bearing by an amount equal to twice the weight of a bearing because gravity is aiding the top spring and opposing the lower one.

*Operation*

With the thrust bearing assembly including springs 64 and 66 installed in a machine in the manner shown in FIGURE 2, during starting of the motor, the thrust forces will be downward and water will be squeezed between the lower bearing pads 48 and the runner surfaces to establish a fluid film in the manner described in the said copending application. The runner will be lifted an incremental amount by this action but the upper surface thereof will not contact the crown surface of the upper pads because the angle of convergence will be sufficiently small, by virtue of spring pressure, that water lubricant will flow in a laminar path between the pads and runner surfaces as a result of the viscous drag caused by runner motion. The action of the springs are therefore effective in maintaining a minimum clearance between the pads and runner surfaces such that the trailing pad edges are not permitted to contact the runner surface during operation, as was common in the prior art. Accordingly, the deleterious effects of the type illustrated on the carbon pad of FIGURE 1 will not be generated in a pad surface.

As the motor speed increases, the thrust forces are sometimes transferred from the lower to upper portions of the thrust bearing and since fluid already is flowing between the upper parts, the runner will continue to drag water toward the graduated surfaces on crown pads where it is pressurized an additional amount corresponding to the upward thrust, as it flows toward the zone of minimum clearance between the pads and runner surfaces. In this instance, the lower spring 66 becomes effective to prevent excessive tilting of the lower bearing carbon pads by maintaining a small angle of convergence between the crowned surfaces of the pads and runner surface, thus eliminating the possibility of the trailing edges from contacting the runner. Laminar flow of water lubricant now takes place in the lower portions of the bearing in the same manner as that described above for the upper bearing. As the speed and load decreases, the thrust forces again will be transferred to the lower bearing and a higher pressure fluid film will be established between the runner and pad surfaces in the same manner as that previously described.

Accordingly, a double thrust bearing is provided on opposite sides of a runner wherein each bearing is equipped with a clearance, the total clearance constituting the endplay for the machine. The springs associated with each bearing serve to urge the equalizer mechanisms including the carbon pads toward the runner for establishing a minimum clearance between the parts. When the runner rotates, zero clearance occurs in the thrust bearing which is loaded while maximum clearance exists in the unloaded bearing. The pads and other parts of the unloaded bearing however are not lifted a distance equal to the maximum clearance but only a fraction thereof because the spring will continue to urge the parts toward the runner surface. The amount the unloaded bearing pads will be lifted will be an amount equal to the thickness of the water film established by laminar flow under the unloaded pads.

The springs therefore make possible the maintenance of a smaller angle of convergence between the pads and runner surfaces than is possible in known machines. Smaller convergence angles in machines without springs cannot safely be made because the bearing endplay would have to be reduced from about .035–.080 inch to a range of about .005–.010 inch. Such a small endplay is not considered mechanically safe in large machines.

In the modification shown in FIGURE 10, the springs 64 and 66 have been omitted and coil springs 86 used in lieu thereof. The springs 86 will be distributed in a circular plane around the thrust bearing and their number and strength will be determined in accordance with the respective forces expected to be encountered by the upper and lower thrust bearings comprising the assembly.

Since my objective is to maintain the angle of convergence between the bearing pad and runner surfaces at a predetermined low amount in order to provide a minimum clearance in the neighborhood of .005–.010 inch between the pads and runner surfaces, it will be evident that many other different constructions may be resorted to for fulfilling this inventive concept. For example, a piston may be inserted in a cylinder of approximately the same size as the cavity for the coiled springs and an appropriate pressure applied to the upper surface thereof for urging the carbon pads to a desired direction and position. The pressure in such a system can very readily be controlled by the use of pressure relief valves or other pressure control devices of similar nature.

Although the above disclosure has been directed to a vertical machine for illustrating the teachings of the invention, it will be evident they apply equally to horizontal machines where the thrust forces would be directed laterally rather than vertically. Likewise, the teachings obviously are applicable to single thrust bearings designed to have the thrust exerted in one direction only.

In addition to the many advantages inherent in the construction disclosed herein, it may be noted that the invention makes possible the use of a wider range of end plays in machines utilizing thrust bearings because the springs can be provided with a design corresponding to the endplay needed to be handled. The springs cushion the shock on the various parts of the thrust bearing and machine when the thrust is reversed, and they also serve to cushion the shock to parts during transportation, especially since the pads are held in contact with the runner at this time.

In view of the above, it will be evident that many modifications and variations are possible in light of the above teachings. It therefore is to be understood that within the scope of the appended claims the invention may be practiced otherwise than as specifically described.

What I claim as new and desire to secure by Letters Patent of the United States is:

1. A thrust bearing for a machine comprising a frame enclosing a shaft having a runner on one end thereof, a pair of equalizer mechanisms respectively located on opposite sides of said runner, each of said mechanisms comprising a pivotally supported rocker coupled with a shoe having a bearing pad positioned in engagement with the runner surface, a ring in contact with the outer surface of said rockers on one side of said runner and a circumferential groove disposed in the ring outer surface, a plate of circular configuration having one side in contact with the frame and its other side being spaced from said ring to provide a clearance therebetween, a circular spring in said groove having portions thereof in contact with said rockers for urging the equalizer mechanism into contact with the runner surface, thrust absorbing means in contact with the frame and the outer surface of the rockers on the other side of the runner, a clearance between the outer surface of said rockers and said thrust absorbing means, and spring means between said last named rockers and thrust absorbing means for urging the associated equalizer mechanism into contact with the runner surface.

2. The combination according to claim 1 wherein said thrust absorbing means comprises a structural member having a portion thereof in contact with said rockers on said other side of the runner and a second portion in engagement with the frame, a groove provided in said structural member for receiving said spring means effective in continuously urging said equalizer mechanism into contact with the runner surface, said spring means comprising a continuous ring in said groove having its surface in contact with the rockers positioned around said runner.

3. The combination according to claim 1 wherein the width of the grooves are greater than the springs width to accommodate expansion of said springs when the springs are compressed as a result of the application of thrust forces in either direction.

4. The combination according to claim 1 wherein each of said springs are circular and of a wave-shape design.

References Cited in the file of this patent

UNITED STATES PATENTS

| | | |
|---|---|---|
| 1,121,083 | De Ferranti | Dec. 15, 1914 |
| 2,636,790 | McNally | Apr. 28, 1953 |
| 2,785,022 | Lakey | Mar. 12, 1957 |
| 2,874,007 | Cametti et al. | Feb. 17, 1959 |
| 2,890,916 | Maynard | June 16, 1959 |

FOREIGN PATENTS

| | | |
|---|---|---|
| 8,830 | Netherlands | Apr. 16, 1923 |